(12) United States Patent
Kitano et al.

(10) Patent No.: US 7,662,898 B2
(45) Date of Patent: Feb. 16, 2010

(54) BIOCOMPATIBLE MATERIAL

(75) Inventors: Hiromi Kitano, Toyama (JP); Makoto Genmei, Toyama (JP); Yoshiyuki Saruwatari, Kashiwara (JP); Takahiro Mukaiyama, Kashiwara (JP)

(73) Assignee: Osaka Organic Chemical Ind., Ltd., Osaka-shi, Osaka (JP)

( * ) Notice: Subject to any disclaimer, the term of this patent is extended or adjusted under 35 U.S.C. 154(b) by 483 days.

(21) Appl. No.: 11/596,884

(22) PCT Filed: May 18, 2005

(86) PCT No.: PCT/JP2005/009086

§ 371 (c)(1),
(2), (4) Date: Nov. 17, 2006

(87) PCT Pub. No.: WO2005/113620

PCT Pub. Date: Jan. 12, 2005

(65) Prior Publication Data

US 2008/0262181 A1    Oct. 23, 2008

(30) Foreign Application Priority Data

May 20, 2004    (JP)    ............... 2004-150693

(51) Int. Cl.
*C08F 220/56*    (2006.01)
*C08F 22/16*    (2006.01)

(52) U.S. Cl. ............ 526/307; 526/303.1; 526/307.7; 526/312; 526/321; 526/328.5; 623/903; 623/921; 623/926

(58) Field of Classification Search ............ 526/303.1, 526/307, 307.7, 312, 321, 328.5; 623/903, 623/921, 926
See application file for complete search history.

(56) References Cited

FOREIGN PATENT DOCUMENTS

| JP | 51-9732 A | 1/1976 |
|---|---|---|
| JP | 55-104209 A | 8/1980 |
| JP | 56-92809 A | 7/1981 |
| JP | 6-67122 A | 3/1994 |
| JP | 7-100356 A | 4/1995 |
| JP | 7-300513 A | 11/1995 |
| JP | 9-310228 A | 12/1997 |
| JP | 10-279918 A | 10/1998 |
| JP | 11-130822 A | 5/1999 |
| JP | 2002-68974 A | 3/2002 |
| JP | 2002-121227 A | 4/2002 |
| JP | 2002-322223 A | 11/2002 |
| JP | 2002-348205 A | 12/2002 |
| JP | 2004-339181 A | 12/2004 |

OTHER PUBLICATIONS

Yinghua Ma, et al., "Well-Defined Biocompatible Block Copolymers via Atom Transfer Radical Polymerization of 2-Methacryloyloxethyl Phosphorylcholine in Protic Media"; 2003 American Chemical Society, Macromolecules 2003, vol. 36, No. 10; XP-002473724; pp. 3475-3484; Published on the Web Apr. 24, 2003.

*Primary Examiner*—Helen L. Pezzuto
(74) *Attorney, Agent, or Firm*—Birch, Stewart, Kolasch & Birch, LLP

(57) ABSTRACT

A biocompatible material having excellent biocompatibility such as small interaction with a component of a living body such as a protein or blood cell. A biocompatible material comprising a polymer obtained by polymerizing a monomer composition comprising an amino acid-type betaine monomer represented by the formula (I):

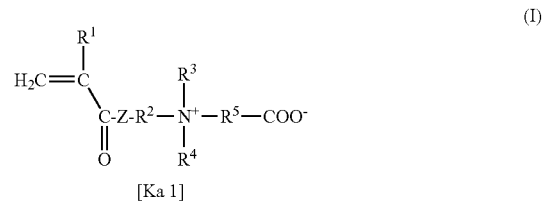

[Ka 1]

wherein $R^1$ is a hydrogen atom or a methyl group; $R^2$ is an alkylene group having 1 to 6 carbon atoms; each of $R^3$ and $R^4$ is independently an alkyl group having 1 to 4 carbon atoms; $R^5$ is an alkylene group having 1 to 4 carbon atoms; and Z is an oxygen atom or an —NH group; and a polymerizable monomer represented by the formula (II):

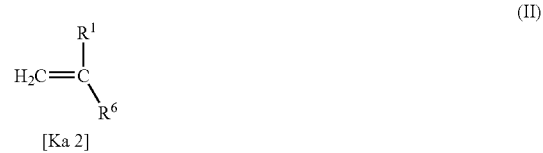

[Ka 2]

wherein $R^1$ is as defined above; and $R^6$ is a monovalent organic group, in a weight ratio, i.e. amino acid-type betaine monomer/polymerizable monomer, of from 1/99 to 100/1. The biocompatible material can be suitably used, for example, in food, a food additive, a medicament, a quasi-drug, a medical device, cosmetics, a toiletry article, or the like.

2 Claims, 2 Drawing Sheets

[Figure 1]
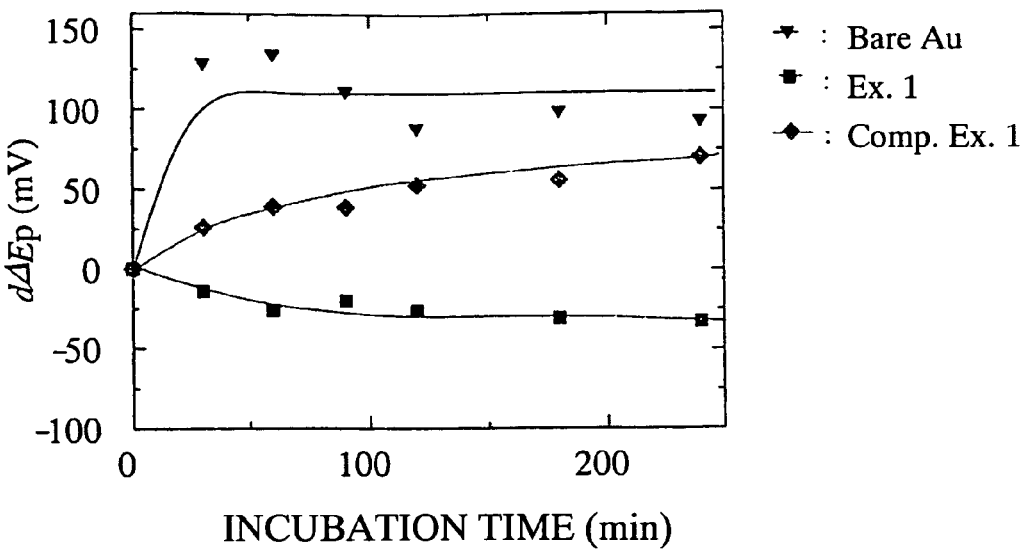
[Figure 2]
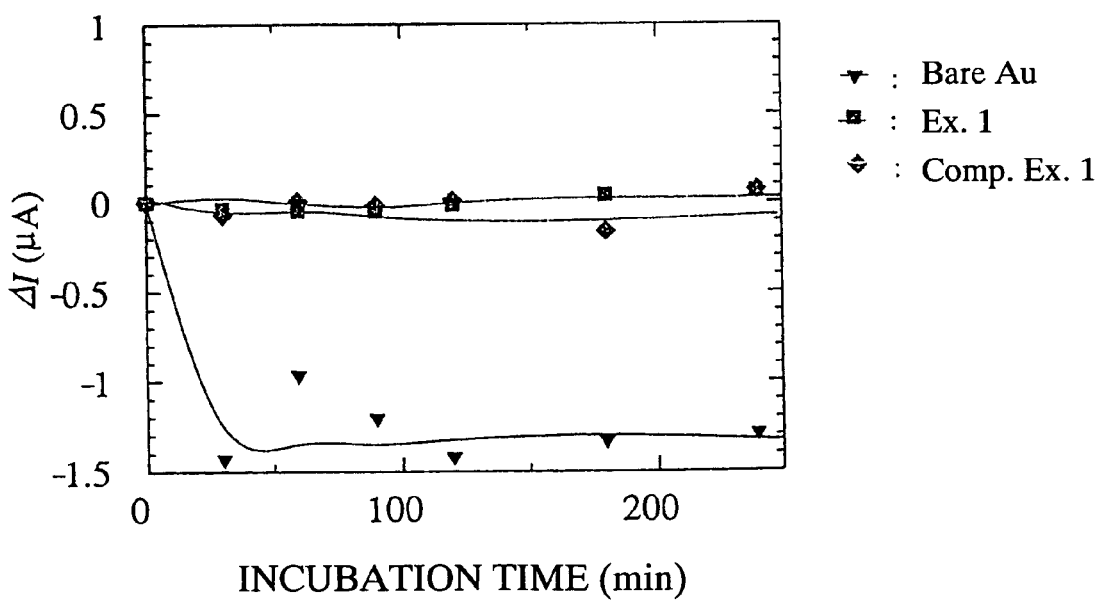

[Figure 3]
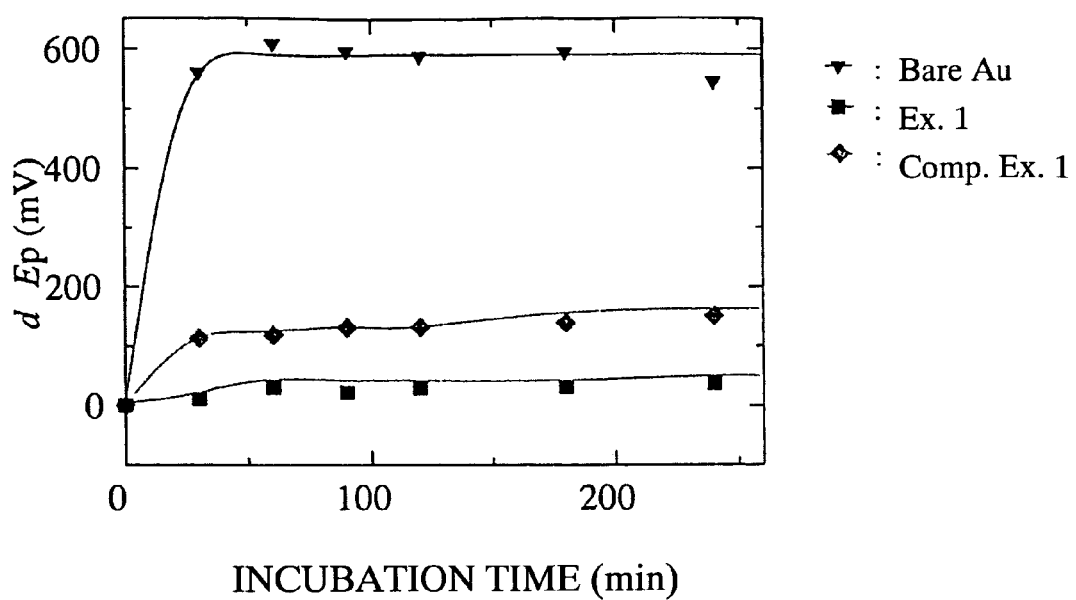

ized as a foreign substance by a living body, so that there are some risks that the materials are denatured by adsorbing a protein or blood cells to surfaces thereof, and that the materials themselves are activated to cause rejection such as coagulation of blood.

US 7,662,898 B2

BIOCOMPATIBLE MATERIAL

TECHNICAL FIELD

The present invention relates to a biocompatible material. More specifically, the present invention relates to a biocompatible material which can be suitably used in food, a food additive, a medicament, a quasi-drug, a medical device, cosmetics, a toiletry article, or the like.

BACKGROUND ART

Biocompatible materials have been expected to be applied in various fields. Presently, artificial materials such as silicone, polyethylene, and polyurethane have been used in medical devices such as medical tubes and catheters. However, these materials are recognized as a foreign substance by a living body, so that there are some risks that the materials are denatured by adsorbing a protein or blood cells to surfaces thereof, and that the materials themselves are activated to cause rejection such as coagulation of blood.

On the other hand, as a material having a glycine-type betaine monomer as a side chain, a glycine-type betaine resin in which betaine is formed by treating with sodium chloroacetate or the like, a polymer obtained by homopolymerizing N,N-dimethylaminoethyl methacrylate, or copolymerizing N,N-dimethylaminoethyl methacrylate with another monomer, or the like has been known (see, for example, Patent Publications 1 to 3).

However, there are some disadvantages in these betaine resins that since it is difficult to perfectly terminate a betaine formation reaction, an N,N-dimethylamino group would remain in the resin, and the remaining N,N-dimethylamino group gives disadvantageous influence to biocompatibility.

Patent Publication 1: Japanese Patent Laid-Open No. Sho 51-9732

Patent Publication 2: Japanese Patent Laid-Open No. Sho 55-104209

Patent Publication 3: Japanese Patent Laid-Open No. Sho 56-92809

DISCLOSURE OF INVENTION

Problems to be Solved by the Invention

The present invention has been accomplished in view of the above-mentioned prior art, and an object of the present invention is to provide a biocompatible material having excellent biocompatibility such as small interaction with a component of a living body such as a protein or blood cell for the development of advanced medical devices or artificial organs of the next generation.

Means to Solve the Problems

The present invention relates to a biocompatible material comprising a polymer obtained by polymerizing a monomer composition comprising an amino acid-type betaine monomer represented by the formula (I):

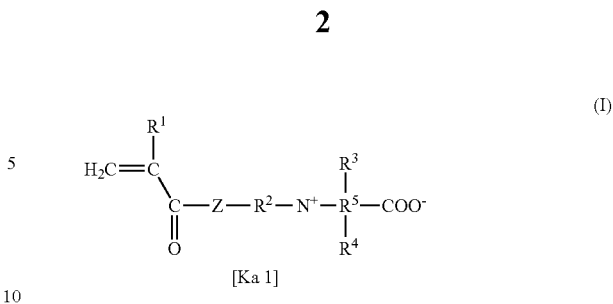

wherein $R^1$ is a hydrogen atom or a methyl group; $R^2$ is an alkylene group having 1 to 6 carbon atoms; each of $R^3$ and $R^4$ is independently an alkyl group having 1 to 4 carbon atoms; $R^5$ is an alkylene group having 1 to 4 carbon atoms; and Z is an oxygen atom or an —NH group; and a polymerizable monomer represented by the formula (II):

wherein $R^1$ is as defined above; and $R^6$ is a monovalent organic group, in a weight ratio, i.e. amino acid-type betaine monomer/polymerizable monomer, of from 1/99 to 100/1.

Effects of the Invention

The biocompatible material of the present invention has excellent biocompatibility such as little interaction with a component of a living body such as a protein or blood cell for the development of advanced medical devices or artificial organs of the next generation. Since the betaine monomer represented by the formula (I) is used in the biocompatible material of the present invention, there is an advantage that molecular design can be freely carried out depending upon its applications.

BRIEF DESCRIPTION OF THE DRAWINGS

FIG. 1 A graph showing the results of evaluation of non-specific adsorption of bovine serum albumin (dΔEp) in Experimental Example 1.

FIG. 2 A graph showing the results of evaluation of non-specific adsorption of bovine serum albumin (ΔI) in Experimental Example 1.

FIG. 3 A graph showing the results of evaluation of non-specific adsorption of lysozyme (dΔEp) in Experimental Example 1.

BEST MODE FOR CARRYING OUT THE INVENTION

In a betaine monomer represented by the formula (I), $R^1$ is a hydrogen atom or a methyl group. $R^2$ is an alkylene group having 1 to 6 carbon atoms. Each of $R^3$ and $R^4$ is independently an alkyl group having 1 to 4 carbon atoms. $R^5$ is an alkylene group having 1 to 4 carbon atoms. Z is an oxygen atom or an —NH group.

Specific examples of the betaine monomer represented by the formula (I) include N-(meth)acryloyloxymethyl-N,N- dimethylammonium-α-N-methylcarboxybetaine, N-(meth)acryloyloxyethyl-N,N-dimethylammonium-α-N-methylcarboxybetaine, N-(meth)acryloyloxypropyl-N,N-dimethylammonium-α-N-methylcarboxybetaine, N-(meth)acryloyloxymethyl-N,N-diethylammonium-α-N-methylcarboxybetaine, N-(meth)acryloyloxyethyl-N,N-diethylammonium-α-N-methylcarboxybetaine, N-(meth)acryloyloxypropyl-N,N-diethylammonium-α-N-methylcarboxybetaine, and the like. These monomers can be used alone or in admixture of two or more kinds.

The term "(meth)acry-" as used herein refers to "acry-" or "methacry-."

Among the betaine monomers represented by the formula (I), N-methacryloyloxyethyl-N,N-dimethylammonium-α-N-methylcarboxybetaine represented by the formula (III):

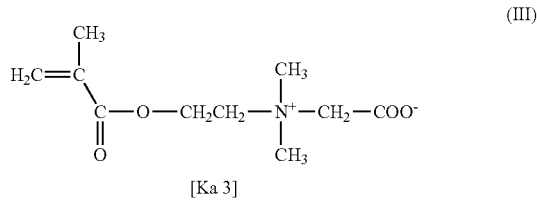

[Ka 3]

is preferable. The betaine monomer represented by the formula (I) as represented by N-methacryloyloxyethyl-N,N-dimethylammonium-α-N-methylcarboxybetaine is easily available in high purity by a method described, for example, in JP-A-Hei-9-95474, JP-A-Hei-9-95586, JP-A-Hei-11-222470, or the like.

In a polymerizable monomer represented by the formula (II), $R^1$ is as defined above. $R^6$ is a monovalent organic group. Representative examples of $R^6$ include a —$COOR^7$ group ($R^7$ is an alkyl group having 1 to 22 carbon atoms), a —COO—$R^8$—OH group ($R^8$ is an alkenyl group having 1 to 4 carbon atoms), a —$CONR^9R^{10}$ group (each of $R^9$ and $R^{10}$ is independently a hydrogen atom, an alkyl group having 1 to 4 carbon atoms), a —OCO—$R^{11}$ group ($R^{11}$ is a methyl group or an ethyl group), a group represented by the formula (IV):

[Ka 4]

wherein $R^{12}$ is an alkylene group having 3 or 5 carbon atoms, a group represented by the formula (V):

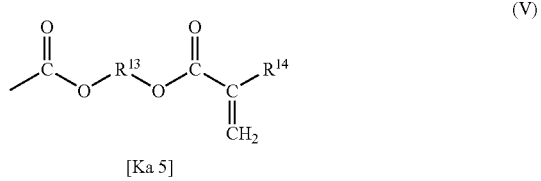

[Ka 5]

wherein $R^{13}$ is an alkyl group having 2 to 9 carbon atoms, and $R^{14}$ is a hydrogen atom or a methyl group, and the like. Among the above-mentioned $R^6$, the —COO—$R^8$—OH group, the —$COOR^7$ group, the —$CONR^9R^{10}$ group, and the group represented by the formula (IV) are preferable from the viewpoint of biocompatibility.

Specific examples of the polymerizable monomer represented by the formula (II) include monofunctional monomers such as methyl(meth)acrylate, ethyl(meth)acrylate, n-butyl (meth)acrylate, isobutyl(meth)acrylate, t-butyl(meth)acrylate, neopentyl(meth)acrylate, cyclohexyl(meth)acrylate, benzyl(meth)acrylate, octyl(meth)acrylate, lauryl(meth) acrylate, stearyl(meth)acrylate, cetyl(meth)acrylate, ethyl carbitol(meth)acrylate, hydroxyethyl(meth)acrylate, hydroxypropyl(meth)acrylate, hydroxybutyl(meth)acrylate, methoxyethy (meth)acrylate, methoxybutyl(meth)acrylate, N-methyl(meth)acrylamide, N-ethyl(meth)acrylamide, N-propyl (meth)acrylamide, N-isopropyl(meth)acrylamide, N-butoxymethyl(meth)acrylamide, N-t-butyl(meth)acrylamide, N-octyl(meth)acrylamide, N,N-dimethyl(meth)acrylamide, N,N-diethyl(meth)acrylamide, (meth)acryloyl morpholine, diacetone(meth)acrylamide, styrene, methyl itaconate, ethyl itaconate, vinyl acetate, vinyl propionate, N-vinyl pyrrolidone, and N-vinyl caprolactam; polyfunctional monomers such as 1,4-butanediol di(meth)acrylate, 1,6-hexanediol di(meth)acrylate, 1,9-nonanediol di(meth) acrylate, 2-n-butyl-2-ethyl-1,3-propanediol di(meth)acrylate, tripropyleneglycol di(meth)acrylate, tetraethyleneglycol di(meth)acrylate, methylenebisacrylamide, trimethylolpropane tri(meth)acrylate, and pentaerythritol tri (meth)acrylate; and the like. These monomers can be used alone or in admixture of two or more kinds.

Among the polymerizable monomers represented by the formula (II), butyl(meth)acrylate, stearyl(meth)acrylate, N,N-dimethyl acrylamide, N-vinyl pyrrolidone, hydroxyethyl(meth)acrylate, and the like are preferable from the viewpoint of biocompatibility.

Amounts of the betaine monomer represented by the formula (I) and the polymerizable monomer represented by the formula (II) cannot be unconditionally determined because the amounts would differ depending upon the region of body where a biocompatible material is used, purpose of use, or the like. The amounts of the both monomers are adjusted so that the betaine monomer represented by the formula (I)/the polymerizable monomer represented by the formula (II), in a weight ratio, is from 1/99 to 100/0, preferably from 5/95 to 95/5, and more preferably from 10/90 to 90/10, from the viewpoint of biocompatibility, hydrophilicity, water resistance, adsorbability of a biological component, rigidity, workability, or the like.

Here, when a monomer composition is composed only of a betaine monomer represented by the formula (I), the resulting polymer is a homopolymer of the betaine monomer represented by the formula (I). When a monomer composition is composed of a betaine monomer represented by the formula (I) and a polymerizable monomer represented by the formula (II), the resulting polymer is a copolymer of the betaine monomer represented by the formula (I) and the polymerizable monomer represented by the formula (II).

A polymer constituting a biocompatible material can be prepared by polymerizing a monomer composition, for example, by a solution polymerization using water or an organic solvent as a solvent. More specifically, the polymer can be obtained by dissolving a monomer composition containing given amounts of a betaine monomer represented by the formula (I) and a polymerizable monomer represented by the formula (II) in purified water or an organic solvent; adding a polymerization initiator to the resulting solution while stirring; and polymerizing the monomer composition in an inert gas atmosphere.

The organic solvent includes, for example, alcohols such as methyl alcohol, ethyl alcohol, isopropyl alcohol, ethylene glycol, and propylene glycol; ketones such as acetone and methyl ethyl ketone; alkyl ethers such as diethyl ether and tetrahydrofuran; aromatic compounds such as benzene, toluene, and xylene; aliphatic hydrocarbon compounds such as n-hexane; alicyclic hydrocarbon compounds such as cyclohexane, acetic acid esters such as methyl acetate and ethyl acetate; and the like. The present invention is not limited to those exemplified above.

It is preferable that the concentration of the monomer composition in the solution of the monomer composition usable in the solution polymerization is from 10 to 80% by weight or so, in consideration of operability of polymerization, or the like.

During the polymerization, it is preferable to use a polymerization initiator. The polymerization initiator is not particularly limited, and includes, for example, ordinary azo-based polymerization initiators and peroxide-based polymerization initiators, such as azoisobutyronitrile, methyl azoisobutyrate, azobisdimethylvaleronitrile, benzoyl peroxide, potassium persulfate, and ammonium persulfate; and photopolymerization initiators such as benzophenone derivatives, phosphine oxide derivatives, benzoketone derivatives, phenylthio ether derivatives, azide derivatives, diazo derivatives, and disulfide derivatives; and the like. It is preferable that the amount of the polymerization initiator is usually from 0.01 to 5 parts by weight or so, based on 100 parts by weight of the monomer composition.

During the polymerization, a chain transfer agent can be optionally used. The chain transfer agent includes, compounds having a mercaptan group such as laurylmercaptan, dodecylmercaptan, and thioglycerol; inorganic salts such as sodium hypophosphite and sodium hydrogensulfite; and the like, and the present invention is not intended to be limited only to those exemplified. It is preferable that the amount of the chain transfer agent is usually from 0.01 to 10 parts by weight or so, based on 100 parts by weight of the monomer composition.

The polymerization temperature of the monomer composition cannot be unconditionally determined, because the polymerization temperature varies depending upon the kinds of the polymerization initiator used. Usually, it is preferable that the polymerization temperature is a 10-hour half-life temperature of the polymerization initiator. It is desired that the polymerization time is 2 hours or more, preferably from 2 to 24 hours or so, from the viewpoint avoiding unreacted monomers to be remaining in the reaction mixture. The polymerization of the monomer composition can be carried out in an atmosphere of an inert gas. The inert gas includes, for example, nitrogen gas, argon gas, and the like.

The presence or absence of the unreacted monomer in the reaction system can be confirmed by a general analyzing method such as gas chromatography.

Thus, a polymer can be obtained by polymerizing a monomer composition. The resulting polymer can be collected by fractionating the reaction mixture using an ultrafiltration membrane or the like, and optionally cleaning according to an ordinary method.

The resulting polymer has a weight-average molecular weight of preferably from 500 to 2,000,000, more preferably from 1,000 to 1,000,000, from the viewpoint of handling ability during production, and workability of the formed product.

The biocompatible material of the present invention comprises the above-mentioned polymer. The biocompatible material of the present invention may be constituted by the above-mentioned polymer alone, or may be optionally constituted by the above-mentioned polymer and other polymer within the range that would not impede the object of the present invention.

Since the biocompatible material of the present invention has excellent biocompatibility, the biocompatible material can be suitably used in food, a food additive, a medicament, a quasi-drug, a medical device, cosmetics, a toiletry article, or the like.

The food and the food additive include, for example, those that are used in ordinary foods, such as thickening agents, pH adjustment agents, molding aids, and wrapping materials; the medicament, the quasi-drug, and the medical device include, for example, drug delivery system agents, artificial blood vessels, blood dialysis membranes, catheters, contact lenses, blood filters, blood storage bags, artificial organs, and the like; the cosmetics and the toiletry article include, for example, shampoos, rinses, conditioners, milky lotions, moisturizing cream, soaps, skin cleaning agents, pack agents, cortical peeling agents, hair-styling agents, hair-dyes, hair decolorizing agents, permanent agents, perfumes, antiperspirants, refreshing agents, disposable diapers, sanitary articles, bath detergents, dishwashing detergents, filtration filters for tap water, and the like, and the present invention is not limited only to those exemplified.

EXAMPLES

The present invention will be specifically described hereinbelow by the Examples, without intending to limit the scope of the present invention thereto.

Example 1

The amount 11.9 mg of tetraethylthiuram disulfide was added as a photopolymerization initiator to a monomer composition composed of 234 mg of N-methacryloyloxyethyl-N,N-dimethylammonium-α-N-methylcarboxybetaine and 13.6 mg of bis[4-(N,N-diethyldithiocarbamoylmethyl)benzylamide ethyl sulfide]. Thereafter, the mixture was dissolved in a mixed solvent of 2.5 mL of methanol and 1 mL of tetrahydrofuran, and nitrogen gas was allowed to pass through the resulting solution for 15 minutes. Subsequently, the solution was irradiated with ultraviolet rays at a temperature of 25° C. in an nitrogen gas atmosphere for 4 hours, to subject the monomer composition to photopolymerization.

Next, the polymerized mixture was fractionated by ultrafiltration (fractionated molecular weights: 3,000 to 10,000), and the fraction was lyophilized to collect the formed polymer (yield: 45 mg). Degree of polymerization and weight-average molecular weight of the resulting polymer were examined by $H^1$-NMR. As a result, the degree of polymerization was 23.1, and the weight-average molecular weight was 5,500. The determination results for $H^1$-NMR are as follows.

$^1$H-NMR (400 MHz, $D_2O$): 1.08 (t, m, 3H, 2H, —$CH_3$, —$CH_2$—), 2.21 (m, 2H, —$CH_2$—), 3.38 (t, 2H, 3H, N—$CH_2$—, N—$CH_3$), 3.70 (m, 2H, 2H, N—$CH_2$—, —$CH_2$—COOH), 4.76 (d, 2H, O—$CH_2$—), 7.2-7.8 (m, 4H, -Ph-)

Example 2

The same procedures as in Example 1 were carried out except for using 250 mg of a mixture of butyl methacrylate and N-methacryloyloxyethyl-N,N-dimethylammonium-α-N-methylcarboxybetaine [weight ratio of butyl methacrylate/N-methacryloyloxyethyl-N,N-dimethylammonium-α-N-methylcarboxybetaine: 4/6] as a monomer composition in Example 1, to give a polymer.

Next, the polymerized mixture was fractionated by ultrafiltration (fractionated molecular weights: 3,000 to 10,000), and the fraction was lyophilized to collect the formed polymer (yield: 50 mg). Weight-average molecular weight of the resulting polymer was examined by $H^1$-NMR. As a result, the weight-average molecular weight was 18,000.

Example 3

Twenty-five milliliters of methanol was added to 5.0 g of N-methacryloyloxyethyl-N,N-dimethylammonium-α-N-methylcarboxybetaine, and 70.8 mg of 2,2-azobisisobutyronitrile as a polymerization initiator and 0.15 mL of 2-mercaptoethanol as a chain transfer agent were added thereto, and the components were polymerized at 70° C. for 24 hours. Thereafter, the polymerized mixture was concentrated, and the concentrate was further dissolved in water. The solution was fractionated by dialysis (fractionated molecular weight: 1,000), and the fraction was lyophilized to collect the formed polymer (yield: 3.6 g). Weight-average molecular weight of the resulting polymer was examined by gel permeation chromatography (mobile phase: a 0.1 M aqueous sodium bromide containing 0.5% lithium bromide). As a result, the weight-average molecular weight was 11,400.

Example 4

The amount 2.23 mL of N-methacryloyloxyethyl-N,N-dimethylammonium-α-N-methylcarboxybetaine and butyl methacrylate [weight ratio of N-methacryloyloxyethyl-N,N-dimethylammonium-α-N-methylcarboxybetaine/butyl methacrylate: 45/55] was used in place of 5.0 g of N-methacryloyloxyethyl-N,N-dimethylammonium-α-N-methylcarboxybetaine in Example 2, and the components were polymerized at 70° C. for 24 hours. Thereafter, the polymerized mixture was introduced into n-hexane to precipitate the polymer, and the precipitates were further dissolved in water. The solution was fractionated by dialysis (fractionated molecular weight: 3,500), and the fraction was lyophilized to collect the formed polymer (yield: 1.6 g). Weight-average molecular weight of the resulting polymer was examined by gel permeation chromatography (mobile phase: a 0.1 M aqueous sodium bromide containing 0.5% lithium bromide). As a result, the weight-average molecular weight was 17,800.

Comparative Example 1

The same procedures as in Example 1 were carried out except that 234 mg of methacrylic acid was used in place of 234 mg of N-methacryloyloxyethyl-N,N-dimethylammonium-α-N-methylcarboxybetaine. Degree of polymerization and weight-average molecular weight of the resulting polymer were examined by $H^1$-NMR. As a result, the degree of polymerization was 16, and the weight-average molecular weight was 2,700.

Comparative Example 2

For the sake of comparison with Example 2, sodium polyethylenesulfonate (weight-average molecular weight: 2,200) was used.

Comparative Example 3

For the sake of comparison with Example 2, poly-L-lysine hydrobromide (weight-average molecular weight: 2,700) was used.

Comparative Example 4

For the sake of comparison with Example 2, polyethylene glycol (weight-average molecular weight: 2,000) was used.

Comparative Example 5

For the sake of comparison with Example 2, poly-N-vinylpyrrolidone (weight-average molecular weight: 2,300) was used.

Experimental Example 1

Next, a self-organizing monomolecular film made of the polymer each obtained in Example 1 and Comparative Example 1 was examined for its cyclic voltammetry.
More specifically, as an electrode, a gold electrode (AUE 6.0×1.6 mm; BAS) was polished with alumina powder, and thereafter this gold electrode was irradiated with ultrasonic wave (Sine Sonic 150, Sine) for 30 seconds. The procedures were repeated several times, and thereafter the electrode was immersed in a 0.1 N aqueous sulfuric acid or a 0.5 N aqueous potassium hydroxide, and voltage was applied thereto, using a cyclic voltammogram (POTENTIOSTAT: manufactured by Hokuto Denko Corporation, product number: HA-301), a functional generator [manufactured by Hokuto Denko Corporation, product number: HA-104], a power supply, and a alternating current-direct current converter [manufactured by Epson, product number: PC-486 SE]. Here, when a 0.1 N aqueous sulfuric acid was used, a voltage of from −0.4 to 1.5 V was applied thereto, and when a 0.5 N aqueous potassium hydroxide was used, a voltage of from 0 to −1.5 V was applied thereto.

Next, the surface of the gold electrode was washed, and thereafter the gold electrode was immersed in an aqueous solution containing 0.5 M potassium chloride and 5 mM potassium hexacyanoferrate(III), and cyclic voltammogram was examined at a sweep rate of 10 mV/s and a applied voltage of from 0.6 to −0.3 V. After having confirmed that a potential difference (hereinafter referred to as ΔEp) was 65 mV or less, this gold electrode was used.

The above-mentioned gold electrode was immersed in a 1 mg/mL aqueous solution of the material obtained in Example 1 and Comparative Example 1 for 24 hours, and thereafter washed several times with purified water.

The gold electrode modified with the materials obtained in Example 1 and Comparative Example 1 was observed for protein non-specific adsorption using a 10 mM phosphate buffer having a pH of 7.0, the phosphate buffer containing 1 mM hydroquinone and 0.1 M sodium sulfate (hereinafter referred to a HQ solution).

Bovine serum albumin (BSA, pI: 4.8, 66 kD) or lysozyme (pI: 10.9, 1.4 kD) was dissolved in a 10 mM phosphate buffer having a pH of 7.0, to give a protein solution (1 mg/mL). Before immersion in the protein solution, the electrode was examined for the cyclic voltammogram with the HQ solution, and its potential difference was defined as 0 mV. Thereafter, the electrode was immersed in the protein solution, lifted away from the solution in a given time interval to be washed several times with purified water, and examined for the cyclic voltammogram with the HQ solution.

ΔEp before immersion of the electrode in protein was subtracted from ΔEp after the immersion, and the resultant value was defined as dΔEp.

In a case where the protein or the like is not found to be adsorbed on a surface of the self-organizing monomolecular film, since no substances besides the adsorbate impede transfer of a reduction-oxidation substance, the value of dΔEp would be 0 mV. In addition, when the environment on the self-organizing monomolecular film undergoes a change caused by non-specific adsorption or the like, the transfer of the reduction-oxidation substance is impeded, so that the value of dΔEp increases. Utilizing the phenomena, the non-specific adsorption or the like of the protein was observed. The results are shown in FIGS. 1 to 3.

FIG. 1 is a graph showing the results of evaluation of non-specific adsorption of bovine serum albumin (dΔEp) in Experimental Example 1. It can be seen from the results shown in FIG. 1 that the value of dΔEp of Example 1 is nearly 0, hardly showing any changes, whereas cases where the value of dΔEp increases as in a case where a gold electrode without formation of a monomolecular film is used (Bare Au in FIG. 1) and a case of Comparative Example 1. It can be seen from this finding that the gold electrode in which a self-organizing monomolecular film made of a biocompatible material according to Example 1 is formed has a small amount of protein adsorbed to its surface, so that the gold electrode is excellent in biocompatibility.

FIG. 2 is a graph showing the results of evaluation of non-specific adsorption of bovine serum albumin (ΔI) in Experimental Example 1. It can be seen from the results shown in FIG. 2 that the value of ΔI of Example 1 hardly shows any changes, whereas cases where the value of ΔI dramatically lowers as in a case where a gold electrode without formation of a monomolecular film is used (Bare Au in FIG. 2). It can be seen from this finding that the gold electrode in which a self-organizing monomolecular film made of a biocompatible material according to Example 1 is formed has a small amount of protein adsorbed to its surface, so that the gold electrode is excellent in biocompatibility.

FIG. 3 is a graph showing the results of evaluation of non-specific adsorption of lysozyme (dΔEp) in Experimental Example 1. It can be seen from the results shown in FIG. 3 that the value of dΔEp of Example 1 is nearly 0, hardly showing any changes, whereas cases where the value of dΔEp increases as in a case where a gold electrode without formation of a monomolecular film is used (Bare Au in FIG. 3) and a case of Comparative Example 1. It can be seen from this finding that the gold electrode in which a self-organizing monomolecular film made of a biocompatible material according to Example 1 is formed has a small amount of protein adsorbed to its surface, so that the gold electrode is excellent in biocompatibility.

It can be seen from the above results that the biocompatible material obtained in Example 1 hardly adsorbs a protein such as bovine serum albumin or lysozyme, so that the biocompatible material is excellent in biocompatibility.

Experimental Example 2

The O—H stretching vibrations of water for the materials obtained in Examples 3 and 4 and Comparative Examples 2 to 5 were determined in accordance with Raman spectroscopy.

More specifically, the O—H stretching vibrations of water were determined using a 10% by weight aqueous solution of each of the materials obtained in Examples 3 and 4 and Comparative Examples 2 to 5 in accordance with Raman spectroscopy. The results are shown in Table 1. Here, the determination conditions for Raman spectroscopy, and the determination methods for the N value and the $N_{corr}$ value in Table 1 are as follows.

[Determination Conditions for Raman Spectroscopy]

Raman spectrometer, manufactured by JASCO Corporation (product no.: NR-1100)
Light source: Ar$^+$ laser
Wavelength: 488 nm
Quantity of light: 200 mW
Resolution: 5 cm$^{-1}$

[Determination Methods for N Value and $N_{corr}$ Value]

A possibility of excluding O—H vibrations from a network of hydrogen bonding of water molecules caused by undesired position and orientation due to interaction of the solvents is represented by Pd. Pd is obtained by the formula:

$$Pd=Cw-Cx)\div Cw,$$

wherein Cw is an O—H vibration intensity inherent in water; Cx is an O—H vibration intensity of a solution.

The N value is the number of defects of hydrogen bonds introduced into a network structure of the hydrogen bonding of water per one monomer unit of a polymer. The N value is obtained by the formula:

$$N\text{ Value}=Pd/Fx,$$

wherein Fx is the number of monomers per one O—H.

The C value is a relative intensity of a collective O—H stretching vibration. Since a C value to pure water ($C_W$) is smaller than a C value to perfect ice ($C_{ice}$), the N value is corrected by this factor, to give $N_{corr}$ value, which is a corrective value of the N value. The $N_{corr}$ value is obtained by the formula:

$$N_{corr}\text{ Value}=(CW/C_{ice})\times N\text{ Value}.$$

In addition, the C value is obtained by the formula:

$$C\text{ Value}=\int Ic(w)dw/\int I_{//}(w)dw,$$

wherein Ic is a corrective intensity, and $I_{//}$ is a parallel intensity, and the formula:

$$Ic=I_{//}-I_\perp/\rho,$$

wherein $I_{//}$ is as defined above, $I_\perp$ is a vertical intensity, and $\rho$ is a degree of depolarization.

TABLE 1

| Ex. No. | Weight-Average Molecular Weight | N Value | $N_{corr}$ Value |
|---|---|---|---|
| 3 | 11,400 | −0.27 | −0.18 |
| 4 | 17,800 | 0.02 | 0.02 |
| Comp. Ex. | | | |
| 2 | 2,200 | 7.5 | 5.1 |
| 3 | 2,700 | 8.1 | 5.5 |
| 4 | 2,000 | 1.0 | 0.7 |
| 5 | 2,300 | 0.9 | 0.6 |

It can be seen from the results shown in Table 1 that the materials obtained in Examples 3 and 4 have smaller N values and $N_{corr}$ values than those of Comparative Examples 2 to 5, so that the network structure of hydrogen bonding of water near the polymer is hardly broken, whereby showing excellent biocompatibility.

INDUSTRIAL APPLICABILITY

Since the biocompatible material of the present invention is excellent in biocompatibility, the biocompatible material can be suitably used, for example, in food, a food additive, a medicament, a quasi-drug, a medical device, cosmetics, a toiletry article, or the like.

The invention claimed is:

1. A medical device comprising a biocompatible material comprising a polymer obtained by polymerizing
   a monomer composition comprising an amino acid-type betaine monomer represented by the formula (I):

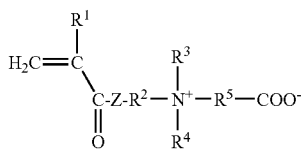

(I)

wherein $R^1$ is a hydrogen atom or a methyl group; $R^2$ is an alkylene group having 1 to 6 carbon atoms; each of $R^3$ and $R^4$ is independently an alkyl group having 1 to 4 carbon atoms; $R^5$ is an alkylene group having 1 to 4 carbon atoms; and Z is an oxygen atom or an —NH group; and a polymerizable monomer represented by the formula (II):

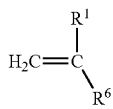

(II)

wherein $R^1$ is as defined above; and $R^6$ is a monovalent organic group, in a weight ratio of amino acid-type betaine monomer/ polymerizable monomer of from 1/99 to 100/0, wherein said medical device is selected from the group consisting of artificial blood vessels, blood dialysis membranes, catheters, blood filters, blood storage bags, and artificial organs.

2. The medical device according to claim 1, wherein the amino acid-type betaine monomer is N-methacryloyloxy-ethyl-N,N-dimethylammonium-α-N-methylcarboxybetaine represented by the formula (III):

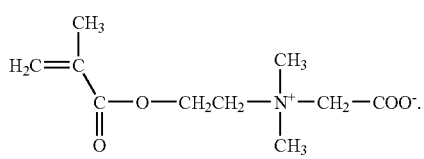

(III)

* * * * *